Nov. 15, 1949     N. E. SEARLE     2,487,832

PROCESS FOR PREPARING ANISOLE

Filed Nov. 2, 1946

INVENTOR.
NORMAN E. SEARLE
BY
*Albert B. Griggs*
ATTORNEY

Patented Nov. 15, 1949

2,487,832

UNITED STATES PATENT OFFICE 2,487,832

PROCESS FOR PREPARING ANISOLE

Norman E. Searle, Wilmington, Del., assignor to E. I. du Pont de Nemours & Company, Wilmington, Del., a corporation of Delaware Application November 2, 1946, Serial No. 707,483

4 Claims. (Cl. 260—612)

This invention relates to the manufacture of anisole and more particularly to processes for the manufacture of anisole from phenol and dimethyl ether, which processes comprise the steps of leading phenol and dimethyl ether into a reaction zone and in the reaction zone contacting the phenol and the dimethyl ether in admixture in the vapor phase with a solid dehydrating catalyst at a temperature of about 200 to 400° C.

It is an object of the invention to provide methods for the manufacture of anisole. A further object is to provide practical commercial continuous vapor phase processes for the manufacture of anisole in which phenol and dimethyl ether are continuously brought together as reactants in the vapor phase and contacted with a dehydrating catalyst. A still further object is to provide methods for the manufacture of anisole in relatively high yield by reacting phenol and dimethyl ether in the vapor phase in the presence of a catalyst, separating unreacted dimethyl ether, and returning it for admixture with phenol and methyl alcohol. Other objects will appear hereinafter.

The foregoing and other objects of the invention are attained by leading phenol into a reaction zone, leading dimethyl ether into the same reaction zone, and in the reaction zone contacting said phenol and said dimethyl ether in admixture in the vapor phase with a solid dehydrating catalyst at a temperature of about 200 to 400° C.

Figure 1:
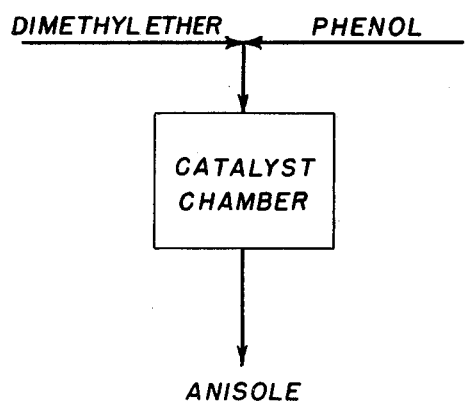

The nature of this invention will be better understood by reference to the accompanying drawings wherein:

Figure 1 is a flowsheet showing a procedure for carrying out the processes of the invention.

Figure 2:
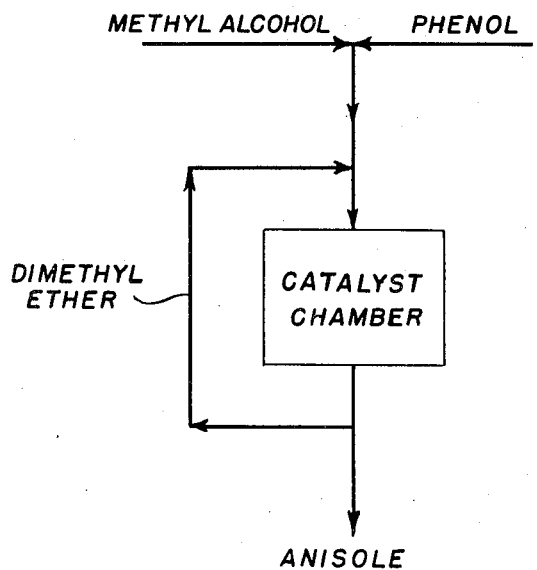

Figure 2, also a flowsheet, illustrates a simplified and preferred procedure in which unreacted dimethyl ether is recycled.

Dimethyl ether for use in the preparation of anisole according to the processes of this invention may be obtained by any of the well-known methods of manufacture. The dimethyl ether may be prepared, for example, by reaction of methyl alcohol with sulfuric acid or by the conversion of methyl alcohol to dimethyl ether by contact of gaseous methyl alcohol with a suitable catalyst such as activated alumina or silicic acid gel.

Phenol for use in the processes of the invention may be obtained by any conventional means, the usual commercial phenol being of satisfactory quality.

The invention, as illustrated by Figure 1, is based on the concept of preparing anisole by the reaction of phenol and dimethyl ether and the discovery that the reaction can be attained by leading dimethyl ether and phenol into a reaction zone and contacting the reaction while in mixture and in the vapor phase with a suitable catalyst.

In bringing together dimethyl ether and phenol, it is preferred to control the amounts so that there is present at the time of contact of the reactants with the catalyst at least one-half mole of dimethyl ether for each mole of phenol. Preferably, there is led into the reaction zone from 1 to 2 moles of dimethyl ether for each mole of phenol.

Various methods, which will be apparent to one skilled in the art, may be used for bringing the reactants, phenol and dimethyl ether, into admixture and heating them to the reaction temperature so that on contact with a suitable catalyst anisole will be produced. For example, the mixing and heating may be carried out by vaporizing the phenol and then leading the gaseous phenol and gaseous dimethyl ether separately into a common feed pipe in which the vapors are mixed. The mixed vapors may then be heated to the temperature applied in the reaction zone prior to contact with the catalyst, or, alternatively, a part of the reaction zone itself may be used as a preheating vessel. Other methods of heating and effecting mixture of the reactants will be apparent, such as preheating the reactants to the required reaction temperature before mixing or dissolving gaseous dimethyl ether in molten phenol under pressure and then vaporizing the solution and heating to the desired temperature.

Catalysts suitable for use in the conversion of dimethyl ether and phenol to anisole are of the type known in catalytic practice as dehydrating catalysts. In practicing the processes of this invention, the class of dehydrating catalyst is further restricted to include only those dehydrating catalysts which are solid at the reaction temperature. Perhaps the most common solid dehydrating catalysts are the activated aluminas which are generally prepared by the heat treatment of aluminum hydroxide. The activated aluminas comprise a preferred type of solid dehydrating catalyst for use in the processes of this invention. Other solid dehydrating catalysts suitable for use in the processes of the invention are, for example, the oxides of thorium, tungsten, titanium, zirconium, molybdenum, and chromium either alone or together with promoters such as the oxides of aluminum, magnesium, zinc, and potassium carbonate. Heat treated clays, such as kaolin, are also recognized in the art as dehydrating catalysts and are effective in promoting the reaction of dimethyl ether and phenol according to the processes of this invention.

The best conversions are obtained by keeping the temperature in the reaction zone between the limits of 200 and 400° C. It will be appreciated that the optimum temperature within the limits prescribed will vary with the particular catalyst used and the particular adjustment of other process variables such as the relative proportions of the ingredients and the flow rates.

The contact of reactants with the catalyst may be effected in any of the ways known and practiced in catalytic operations. For example, the gaseous reactants may be passed downward or upward thru a reaction vessel packed with a granular catalyst mass, such catalyst mass being composed entirely of active catalyst or a combination of carrier and active catalyst. The activity of the catalyst may be varied thruout the catalyst zone or zones as desired. Alternatively, the catalyst chamber or chambers may contain trays for supporting catalyst beds, the trays being so placed that the gases follow a circuitous route in passing thru the reaction zone and are subjected to extended contact with the catalyst mass. The reaction also may be effected by following the so-called "fluid catalyst" method in which the reactant gases are passed thru a finely powdered catalyst, the flow rate of the gases being so regulated as to maintain the catalyst mass in an ebullient or apparent boiling condition. In the latter type of operation the catalyst chamber may be so designed that no substantial amounts of catalyst are carried along with the effluent gases or circulating catalyst system may be used in which the catalyst is separated from the effluent gases in a vessel such as a cyclone separator, collected and recycled to the reaction vessel for mixture with incoming dimethyl ether and phenol.

Figure 2 illustrates a preferred embodiment of the invention in which phenol, recycled dimethyl ether, and methyl alcohol are led continuously in admixture in a gaseous phase into contact with a solid catalyst at a temperature of about 200 to 400° C. In this embodiment, unreacted dimethyl ether leaving the reaction chamber is separated from anisole and is returned as the aforementioned recycled dimethyl ether and methyl alcohol is introduced into the system in substantially the amount required to replace dimethyl ether consumed in the reaction; that is, in amount corresponding substantially to 2 moles of methyl alcohol per mole of dimethyl ether consumed.

In practicing the embodiment illustrated by Figure 2, it is preferred that the sum of the amounts of dimethyl ether and methyl alcohol employed be in excess of the amount of said mixture stoichiometrically required to react with phenol to form anisole, and still more preferably the sum of the amounts of recycled dimethyl ether and methyl alcohol correspond to about two to four times the total amount required to react with phenol to form anisole.

The gases leaving the catalyst chamber, according to the process illustrated in Figure 2, contain principally anisole, unreacted dimethyl ether, and smaller amounts of unreacted phenol and water. According to the process of the invention the dimethyl ether is separated from the effluent gases and recycled, thus forming a continuous operation. The separation of the ingredients of the effluent gases leaving the reaction zone may be effected in any of the ways well known and used in the art for separating chemicals of this type. Most advantageously, the effluent gases are passed into a rectifying column by means of which the low boiling dimethyl ether is readily separated from the remaining constituents of the gases and may be returned directly for admixture with phenol and methyl alcohol prior to reaction to form additional anisole. After effecting such a separation of dimethyl ether, the other constituents of the effluent gases may be separated by subsequent distillation processes.

Alternatively, the effluent gases from the reaction chamber may be cooled sufficiently to condense all the compounds therein except the dimethyl ether and the gaseous dimethyl ether withdrawn for recycle, the condensed material being separated subsequently by batch or continuous distillation processes, or, if it is desired, the effluent gases from the reaction chamber may be cooled so that substantially the whole of the gases is condensed and the liquid so obtained passed into a fractionating system for separation of the constituents so that the dimethyl ether and unused phenol may be recycled and the product, anisole, recovered.

The invention may be more fully understood by reference to the following examples:

*Example 1*

This example illustrates the process shown in Figure 1.

Molten phenol and dimethyl ether were continuously mixed in the proportions of 54 parts by weight per minute of phenol and 68 parts by weight per minute of dimethyl ether and this mixture was constantly passed into a tube containing 3880 parts by weight of an activated alumina catalyst of 8–14 mesh size. The temperature of the catalyst mass was maintained between about 345 and 355° C. The effluent from the catalyst tube was condensed and the condensate was fractionally distilled to recover the anisole produced. The anisole recovered by operating at 2 hours under the above conditions was 2180 parts by weight, had a boiling point of 154—155° C., and a refractive index of $$n\frac{25.5}{D}=1.5150$$

which compares closely with the boiling point and refractive index of a known sample of anisole.

*Example 2*

This example is illustrative of the process shown in Figure 2 in which unreacted dimethyl ether is recycled and mixed with phenol and make-up methyl alcohol. The rates and conditions given in this example were maintained substantially constant over a 4.43-hour period of operation to obtain representative data.

A mixture of molten phenol and methyl alcohol was prepared containing 5.9 parts by weight of phenol for each part by weight of methyl alcohol. This mixture was then mixed continuously at the rate of 90 parts by weight per minute with gaseous dimethyl ether, the dimethyl ether being supplied at the rate of 51 parts by weight per minute. This rate of addition of dimethyl ether corresponds substantially to the rate at which unreacted dimethyl ether issued from the catalyst tube.

The above mixture, consisting of phenol, dimethyl ether, and methyl alcohol, was passed into a catalyst tube containing 3880 parts by weight of activated alumina. The temperature in the catalyst tube was maintained at about 335–345° C. Unreacted dimethyl ether was separated from the effluent from the catalyst tube by condensing the effluent and then heating it sufficiently to distill off the dimethyl ether. There was recovered from the remaining effluent by fractional distillation a total of 4110 parts by weight of anisole, boiling at 154–155° C.

I claim:

1. A process for the manufacture of anisole which comprises leading phenol into a reaction zone, leading dimethyl ether into the same reaction zone, and in the reaction zone contacting said phenol and said dimethyl ether in admixture in the vapor phase with a solid dehydrating catalyst at a temperature of about 200 to 400° C.

2. A process for the manufacture of anisole which comprises leading phenol and dimethyl ether into a reaction zone in the proportions of at least one-half mole of dimethyl ether for each mole of phenol and in the reaction zone contacting the phenol and the dimethyl ether in admixture in the vapor phase with a solid dehydrating catalyst at a temperature of about 200 to 400° C.

3. A continuous process for the manufacture of anisole which comprises leading phenol and dimethyl ether into a reaction zone in the proportions of at least one-half mole of dimethyl ether for each mole of phenol, in the reaction zone continuously contacting the phenol and dimethyl ether in admixture in the vapor phase with an activated alumina catalyst at a temperature of about 200 to 400° C., whereby anisole is formed, and continuously separating unreacted dimethyl ether from the anisole.

4. A continuous process for the manufacture of anisole which comprises leading phenol, recycled dimethyl ether, and methyl alcohol into a reaction zone in proportions such that the sum of the recycled dimethyl ether and the methyl alcohol is in excess of the stoichiometric amount to react with phenol to form anisole, in the reaction zone continuously contacting the phenol, recycled dimethyl ether, and methyl alcohol in admixture in the vapor phase with an activated alumina catalyst at a temperature of about 200 to 400° C., whereby anisole is formed, continuously separating unreacted dimethyl ether from the anisole, and returning the separated dimethyl ether as the aforementioned recycled dimethyl ether.

NORMAN E. SEARLE.

REFERENCES CITED

The following references are of record in the file of this patent:

Hennion, "Jour. Amer. Chem. Soc.", vol. 55 (1933), pages 2858–2860.

Sowa, "Jour. Amer. Chem. Soc.", vol. 57 (1935), pages 709–711.

Cullinane, "Journal Chem. Soc. (London)" (1945), pages 821–3.

Senderens, "Comptes Rendus", vol. 146 (1908), pages 1211–1213.

Kolka et al., "Jour. Am. Chem. Soc.," vol. 61 (1939), pages 1463–5.